Sept. 23, 1941.　　　　D. E. MORAN　　　　2,256,468

REFRIGERATOR CONTROL DEVICE

Filed March 20, 1941

Inventor:
Don E. Moran,
by Harry E. Dunham
His Attorney.

Patented Sept. 23, 1941

2,256,468

UNITED STATES PATENT OFFICE 2,256,468

REFRIGERATOR CONTROL DEVICE

Don E. Moran, Scotia, N. Y., assignor to General Electric Company, a corporation of New York Application March 20, 1941, Serial No. 384,230

5 Claims. (Cl. 62—4)

My invention relates to refrigerator control devices, more particularly to control devices for refrigerators provided with a cooling mechanism driven by means of an electric motor, and has for its object a simple and reliable electric insulation of the parts of the motor control device from the other metal parts of the refrigerator which may be touched by a person using the refrigerator.

Figure 1:
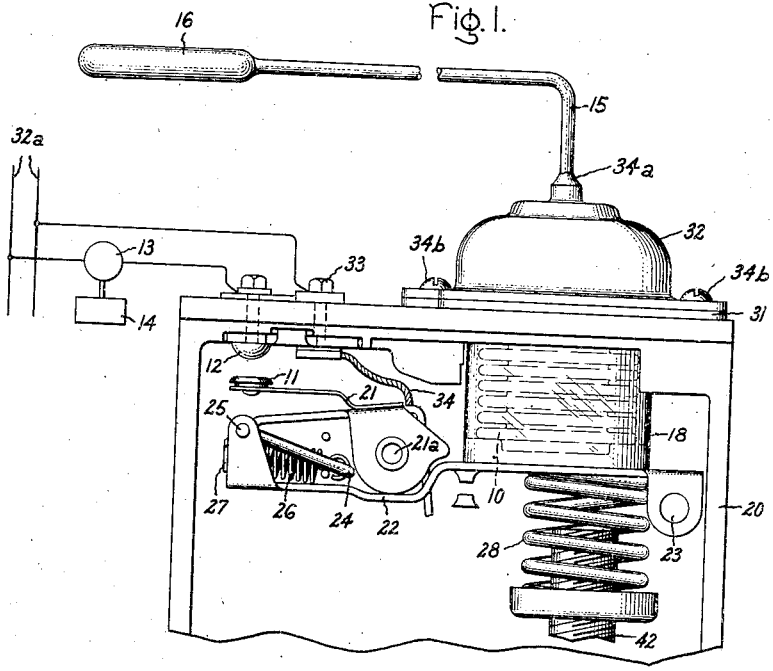
Figure 2:
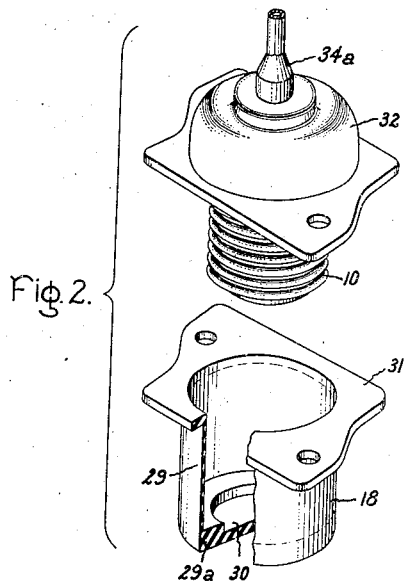

For a more complete understanding of my invention, reference should be had to the accompanying drawing, Fig. 1 of which is a fragmentary view of a refrigerator control device embodying my invention; Fig. 2 is an exploded view showing parts of the device; while Fig. 3 is a diagrammatic view of a complete electric refrigerator.

Referring to the drawing, I have shown my invention in one form as applied to a typical temperature responsive refrigerator motor control device provided with a temperature responsive operating device 10, shown as a metal bellows, which is connected to operate a movable contact 11 with respect to a stationary contact 12 and thereby control the circuit of the motor 13 connected to drive a suitable compressor 14. It will be understood that the bellows 10 forms part of a permanently closed system or chamber, part of which is a metal tube 15 to one end of which the bellows is connected. The tube may be provided with a suitable metal bulb 16 on its other end. This closed system is filled with a suitable vaporizable fluid, for example, methyl chloride or sulphur dioxide.

Figure 3:
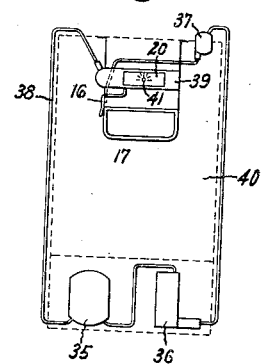

As shown in Fig. 3, the bulb 16 or closed end of the tube is placed in contact with the evaporator or cooling element 17. The evaporator is freely accessible to any person using the refrigerator. Consequently, any electrical connection between the bellows 10 and the electric current-carrying parts of the device results in the charging with an electric potential of the evaporator and other electrically conducting parts of the refrigerator in electrically conducting relation with the bulb 16. It has been found that in certain hot and humid climates the condensation of moisture inside the control device is sufficient to cause this electric charging of the refrigerator parts with great annoyance and considerable hazard to persons using the refrigerator.

In accordance with my invention, I provide a flexible, waterproof, elastic sheath or casing 18 which surrounds the bellows 10 so as to electrically insulate thereby the bellows from the current-carrying parts of the device. For purposes of illustration, I have shown my invention as applied to a control device of substantially the construction described and claimed in United States Patent 2,179,285, issued on November 7, 1939 to John Eaton. The circuit-controlling parts are enclosed in an electrically insulating casing 20, preferably made of a moulded material. I have shown the movable contact 11 as carried by an arm 21 which is mounted on a stationary pivot 21a. This arm 20 is in turn operated by a snap action by means of a second arm 22 having a stationary pivot 23 and operated directly by the bellows. An operating connection is provided between the two arms by means of a member 24 having a pivot 25 on the end of the arm 22. A tension spring 26 is connected between the end of the arm 24 and the end of an extension 27 connected to the contact-carrying arm 21.

Thus, upon an increase in the temperature of the bulb 16, the bellows expands and presses the arm 22 downward against the force applied by the spring 28 until the pivot 25 reaches the point below the line of action of the spring 26 whereupon the member 24 is snapped by the spring to its upper position and at the same time the movable contact is snapped into engagement with the stationary contact 12. The motor 13 thereupon starts and operates the compressor 14 until the evaporator temperature has decreased to a point at which the spring 28 forces the arm 22 upward and snaps the contact 11 to its open circuit position shown in the drawing thereby to open the motor circuit.

It will be observed that the electrically insulating sheath 18 completely encloses the portion of the bellows 10 inside of the casing 20. The cylindrical side wall 29 is relatively thin and flexible as compared with the closed end bottom wall 29a which is provided with a central recess 30 to receive the lower end of the bellows. Thus the bottom wall 29a forms an operating connection between the bellows and the arm 22. At its upper and open end the sheath 18 is provided with a flange 31 which is clamped against the outer wall of the casing 20 by means of a metal cap 32 secured to and carrying the bellows. It will be understood that the sheath 18 extends through a suitable aperture provided for it in a side wall of the casing 20.

Ordinarily, as shown, the metal parts inside the casing 20 of the control device are electrically connected to the supply source 32a for the refrigerator motor. As shown, the movable contact 11 is connected to an external terminal 33 on the casing by means of a flexible conductor 34 inside the casing electrically connected to the arm 21. This electrical connection between the supply source and the movable contact also connects to the supply source the metal operating parts for the movable contact including the arm 22 and the spring 28.

It will be observed, however, that with the electrically insulating sheath 18 the bellows is very effectively electrically insulated from all parts inside the casing 20, including the arm 22 which it operates. In fact, it will be observed that the creepage paths around the flange 31 on the sheath are entirely prohibitive for the lighting circuit voltages used with domestic refrigerators even though the outer surface of the sheath inside the casing 20 may become wet from the condensation of moisture on it. As a matter of fact, the clamping of the flange 31 by the cap 32 against the outer wall of the casing forms a waterproof joint with the outer wall of the casing and excludes moisture from the flange except only at its exposed outer edge. Thus the interior of the electrical insulating sheath is maintained dry under all atmospheric conditions.

As shown, the metal tube 15 is connected to the metal cap 32 by an hermetic seal or joint 34a which preferably is a soldered or brazed joint. Also, the cap 32 is secured to the outside of the casing 20 by means of self-tapping screws 34b extending into threaded openings in the casing 20. These tapped holes for the screws in the casing 20 do not extend through the wall of the casing which is thickened to receive the screws. In other words, the tapped holes for the screws are closed at their lower ends, as viewed in the drawing, so that moisture collecting on the interior wall of the casing can not come into contact with the screws and therefore can not connect electrically the screws with any current carrying parts in the casing.

While the insulating sheath 18 for the bellows may be made of any suitable, flexible, waterproof, electrically insulating material, I preferably form it by means of a mould from a synthetic resinous material, more specifically from a plasticized polyvinyl chloride composition consisting of 50 per cent polyvinyl chloride and 50 per cent by weight of tricresyl phosphate, such as described and claimed in Patent No. 1,929,453 issued to Waldo L. Semon, on October 10, 1933, for Synthetic rubber-like composition and method of making same.

As shown in Fig. 3, the motor 13 and the compressor 14 driven by it are preferably enclosed in a sealed casing 35. The compressor supplies liquid refrigerant to the evaporator or cooling element 17 through a suitable condenser 36 and a float chamber 37. The refrigerant is withdrawn from the evaporator to the compressor through a conduit 38. The casing 20 with its control parts is secured to a horizontal plate 39 extending across the front of the evaporator 17 in the food compartment 40. By means of an adjustable knob 41 the screw member 42 can be turned as described in the aforesaid Eaton patent to adjust the force applied by the spring 28 and therefore the temperature maintained by the refrigerator.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A control device for an electric refrigerator comprising a casing, electric control means mounted in said casing, temperature responsive means in said casing for operating said control means, an open end flexible sheath made of electrically insulating material enclosing said temperature responsive means, and means for clamping the wall of said sheath around its open end against said casing so as to seal said sheath.

2. A control device for an electric refrigerator comprising a casing made of electrically insulating material, electric control means mounted in said casing, temperature responsive means having an operating portion extending into said casing for operation of said control means, clamping means for securing said temperature responsive means to the exterior of said casing, and an open end flexible sheath made of electrically insulating material enclosing said operating portion of said temperature responsive means in said casing and having its wall at its open end secured against said casing by said clamping means to form a moisture proof joint therebetween.

3. A control device for an electric refrigerator comprising a casing made of electrically insulating material, electric control means mounted in said casing, a bellows having an operating portion extending into said casing for operation of said control means, clamping means for securing said bellows to the exterior of said casing, and an open end flexible sheath made of electrically insulating material enclosing said operating portion of said bellows in said casing and having its wall at its open end secured against the exterior of said casing by said clamping means to form a moisture proof joint therebetween.

4. Electric refrigerating apparatus comprising a compressor, an electric motor driving said compressor, an evaporator connected to said compressor, a casing made of electrically insulating material, switch means mounted in said casing for controlling the starting and stopping of said motor, a temperature responsive device made of electrically conducting material mounted in electrical and thermal engagement with said evaporator and having an operating portion extending into said casing for operation of said switch means, clamping means for securing said temperature responsive means to a wall of said casing, and a flexible sheath made of electrically insulating material enclosing said operating portion of said temperature responsive means in said casing and secured against said wall by said clamping means.

5. Electric refrigerating apparatus comprising a compressor, an electric motor driving said compressor, walls forming a cooling chamber, an evaporator in said cooling chamber connected to said compressor, a casing made of electrically insulating material, switch means mounted in said casing for controlling the starting and stopping of said motor, a temperature responsive device made of electrically conducting material mounted in electrical and thermal engagement with said evaporator and having a bellows operating portion extending into said casing for operation of said switching means so as to maintain a predetermined temperature in said cooling chamber, clamping means on the exterior of said casing for securing said temperature responsive means to said casing, a cylindrical sheath made of flexible electrically insulating material surrounding said operating portion of said temperature responsive means in said casing and provided with a closed end forming an operating connection between said operating portion and said switching means and with an open end extending through a wall of said casing, and a flange on said sheath around said open end secured tightly between said clamping means and an outer surface of said casing.

DON E. MORAN.